US005330715A

United States Patent [19]

Blake et al.

[11] Patent Number: 5,330,715

[45] Date of Patent: Jul. 19, 1994

[54] MULTILAYER TEST DEVICE HAVING FUSION BONDING ATTACHMENT LAYER

[75] Inventors: Kenneth A. Blake; James E. Christner; Leonard J. Lucchese, II, all of Elkhart, Ind.

[73] Assignee: Environmental Test Systems, Inc., Elkhart, Ind.

[21] Appl. No.: 998,203

[22] Filed: Dec. 30, 1992

Related U.S. Application Data

[63] Continuation-in-part of Ser. No. 681,609, Apr. 8, 1991, abandoned.

[51] Int. Cl.[5] .............................................. G01N 21/77

[52] U.S. Cl. ........................................ 422/56; 422/55; 436/169; 436/170; 435/805; 435/970

[58] Field of Search .................... 422/55, 56; 436/169, 436/170; 435/805, 970

[56] References Cited

U.S. PATENT DOCUMENTS

| | | | |
|---|---|---|---|
| 4,061,468 | 12/1977 | Lange et al. | 422/56 |
| 4,776,904 | 10/1988 | Charlton et al. | 422/56 X |
| 4,806,312 | 2/1989 | Greenquist | 422/57 X |
| 5,049,358 | 9/1991 | Lau | 436/163 X |
| 5,096,836 | 3/1992 | Macho et al. | 422/56 X |
| 5,118,472 | 6/1992 | Tanaka et al. | 422/57 X |
| 5,162,238 | 11/1992 | Eikmeier et al. | 422/56 X |
| 5,188,966 | 2/1993 | Eikmeier et al. | 422/55 X |

FOREIGN PATENT DOCUMENTS 0166365 1/1986 European Pat. Off. .

*Primary Examiner*—James C. Housel
*Assistant Examiner*—Maureen M. Wallenhorst
*Attorney, Agent, or Firm*—Harry T. Stephenson

[57] ABSTRACT

A unitized multilayer dry reagent analytical chemistry test structure and device and method of fabricating such device is described. The device includes two or more contiguous layers of absorbent or porous paper or polymeric material, at least one of which is incorporated with a test reagent composition, the layers attached to each other with intermediate porous attachment layers by fusion bonding. When the device is contacted with the fluid being tested the attachment layers allow the free flow of such fluid from one layer to the next.

15 Claims, 1 Drawing Sheet

MULTILAYER TEST DEVICE HAVING FUSION BONDING ATTACHMENT LAYER

This application is a continuation-in-part of copending U.S. application Ser. No. 681,609 filed 8 Apr. 1991 and now abandoned.

FIELD OF THE INVENTION

The present invention relates to unitized multilayer dry reagent test device structures and to the methods and materials associated with the fabrication thereof.

BACKGROUND OF THE INVENTION

The science of analytical chemistry and particularly simple to use dry reagent test devices using analytical chemistry principles has made dramatic progress over the past several decades. At one time such devices simply comprised a piece of filter paper impregnated with the dried residue of a pH indicator or a relatively simple test reagent composition. Devices such as these usually gave an indication of the presence or absence of a substance or a gross condition of the fluid being analyzed, such as, for example, the use of litmus paper to determine if the fluid is acidic or basic. Now such devices are much more complex in structure and composition and can give answers which are as precise, specific and sensitive as those obtained using laboratory procedures and conditions. Moreover, such devices can quite often be used without accompanying instrumentation which permit their use in the field or "on-site" to give nearly instant answers. This obviously eliminates the need for preserving sample integrity, simplifies record keeping and allows the user to take rapid corrective measures.

Dry reagent test devices commonly consist of a bibulous or porous paper or polymeric matrix incorporating a reagent composition which reacts with the substance being determined. The first of such systems were the reagent strip or dip and read type devices which came into widespread use with the introduction of urine screening diagnostic tests during the late fifties and early sixties. Such test devices usually comprise a flat absorbent paper or polymeric matrix pad incorporated with a chemical or biochemical reagent which reacts specifically with the substance being detected (the analyte) to give a measurable response. This measurable response commonly comprises a color which is read visually but may be measured instrumentally to give more accurate and consistent readings. The amount of color is then translated into concentration of analyte in the fluid being tested by either using standard color blocks or algorithms. The reagent pad is often attached to a plastic handle for ease of support and use to become what is known in the art as a reagent strip test device.

Another type of dry reagent test device is the reagent impregnated bibulous or porous matrix which is enclosed or encased in a fluid impervious sheath or covering, usually plastic, which restricts and defines the flow of fluid being tested to an assigned opening, usually located at an end portion of the sheath. In use, this type device is contacted with the fluid being tested such that the opening is exposed to the fluid which wicks up or into the bibulous matrix by capillary action (or is pulled or pushed through the porous matrix), wherein the analyte or a conversion product thereof in the fluid reacts with the reagent to form a localized reaction product giving a visual response as the fluid moves through the matrix. This type device is known as a sheath encased reagent impregnated matrix or SERIM type test device.

The reagent system which is used to impregnate the absorbent pad of the reagent strip test device or the matrix of the SERIM device is more often than not a combination or mixture of chemicals, biochemicals or immunochemicals. The more sophisticated and complicated the reagent system, the more difficult it is to incorporate into the absorbent pad. For ease of formulating and manufacturing, the ideal dry reagent test device comprises a relatively simple chemical mixture incorporated into a single absorbent pad or matrix. When reagent incompatibility is encountered, it is common practice to attempt separation of the various components either chemically or physically. One means commonly utilized is to separate the various components in a single matrix using selective solvent impregnation techniques. Another means is to encapsulate one reagent so that it will not react with the others present in the system until it comes in contact with the fluid being tested.

More recently, it has become the practice of reagent strip or SERIM device formulating scientists to separate the reagents using multilayer reagent strip devices in which the various components are retained in separate layers of the matrix until the test device is utilized. Such multilayer devices have several advantages. In addition to accomplishing the separation of reagents for stability purposes, such matrices can be utilized to pretreat or concentrate the analyte or fluid being tested or to remove or complex an undesirable component or constituent in the sample fluid. It is common practice in the reagent strip art to utilize multilayer matrices; however, such matrices must meet the rather strict requirement that the layers be uniformly bound to each other and that fluid must flow evenly and freely throughout the device. In this regard, to date, most commercial multilayer test devices utilize a series of gel layers such as in film type devices wherein the layers are constructed by pouring one layer on top of the other and using the natural adhesiveness of the gel material for layer attachment.

DESCRIPTION OF THE PRIOR ART

Multilayer reagent strip type products first appeared in the patent literature in the early seventies and have since proliferated extensively. Since many of these multilayer devices utilize gels or film-like materials, many of the patents in this area are assigned to film companies such as Eastman Kodak and Fuji Film. Exemplary of such patents are the following U.S. Pat. Nos.: 4,042,335; 4,066,403; 4,089,747; 4,098,574; 4,160,696; 4,166,763; and, 4,412,005; all assigned to Eastman Kodak Company and 4,418,037; 4,435,362; 4,452,887; 4,540,670; 4,548,906; 4,578,245; and 4,587,100, all assigned to Fuji Photo Film. This list of patents describing film type multilayer test devices is by no means complete.

In addition to these film type patent disclosures, several others describe matrix structures in which layers of paper have been assembled to form a test device. Some of the methods presented are quite novel. For example, in U.S. Pat. No. 4,780,280 a method of attaching layers is disclosed in which sewing is at least partially utilized. For the most part, however, methods are presented in which either the layers are held physically together by means of a device into which the layers are inserted and the device container closed or sealed or the layers are glued together either by spreading adhesive between the layers or on the edges thereof. U.S. Pat. No.

3,811,840 discloses layers of reagent impregnated materials contained and physically retained in a sealed device and U.S. Pat. No. 3,905,582 discloses a structure in which the layers are glued together by means of an organic solvent soluble adhesive such as cellulose acetate. U.S. Pat. No. 4,446,232 discloses a multilayer device in which the several layers are held together by using latex cement at the perimeter of the sandwich.

More recently, methods of attaching matrix layers have been disclosed which are more complex and to some extent take into consideration the shortcomings of the above processes. U.S. Pat. No. 4,776,904 discloses and claims a method of attaching layers of matrix using an intermediate fusible layer wherein laser or ultrasonic energy is used to seal the matrices together at the edges but leaves the reactive areas unaffected and unattached thus allowing fluid flow through such unattached areas. U.S. Pat. No. 5,096,836 describes the use of a melt adhesive spotted on the surfaces of the matrices to allow fluid to flow between such attached areas and U.S. Pat. No. 5,118,472 describes a rather complex method of making a multilayer test device using microspheres of adhesive as the attachment means allowing fluid to flow between such microspheres.

In all of the above means of attaching layers, the problem almost invariably arises concerning the degree to which the method is effective in intimately joining the layers or if it is effective, the degree to which the flow of fluid between the layers is impaired.

SUMMARY OF THE INVENTION

In the present invention, a method of attaching or joining layers of matrix is disclosed which is simple and extremely effective. This method of fabrication and the resulting test device structure basically utilize a multilayer device consisting of two or more layers of porous paper or polymeric matrix materials or a combination thereof which are attached to one another in a contiguous face to face or end to end relationship using an intermediate porous attachment layer. One or more of the matrix layers are incorporated or impregnated with test reagent compositions which give a measurable response, preferably colorimetric, when contacted with the analyte being determined. The attachment layer comprises a preformed fibrous sheet material, amenable to lamination with the matrix layers, which because of its fibrous nature has sufficient porosity to allow the free flow of fluids through this layer both before and after lamination with the matrix layers.

By using such an attachment layer, a continuous interface area is formed between each of the matrices which interface area is defined by the positioning, characteristics and size of the fibers or nonporous portion of such attachment layer. The resulting device may in its simplest configuration comprise one absorbent reagent impregnated matrix layer joined to another by means of the attachment layer. Each reagent impregnated layer is usually separately incorporated with reagent and dried prior to assembly. Because of the resulting intimate attachment of one matrix layer to the next, it has been found that the devices of the present invention have improved performance characteristics, particularly with regard to speed of reaction and uniformity of color development in the test reaction area of the matrix.

DESCRIPTION OF THE PREFERRED EMBODIMENTS

Figure 1:
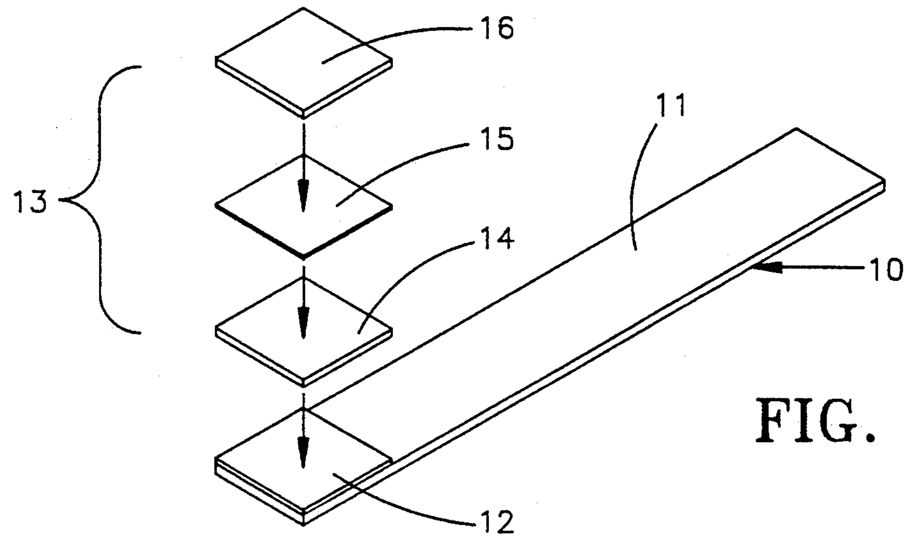
FIG. 1 is a exploded perspective view of a simple reagent strip device showing the basic configuration of a multilayer test device.

As used herein, the following definitions apply: "continuous interface area" means that portion or feature of the multilayer test device structure in which the matrix layers are laminated or attached evenly and continuously to each other across the entire attachment surface area except in those areas defined by the pores of the attachment layer; "chemical substance" is defined as any chemical, biochemical, biological or immunochemical material which can enter into or contribute to a chemical type reaction; "analyte" is defined as the chemical substance contained in or a parameter of the fluid being tested; "reagent" is defined as one or more chemical substances which react with the analyte to give a detectable response thereto; "test fluid or sample" is defined as the liquid environment which contains the analyte; "matrix" is defined as the inert porous or bibulous paper or polymeric support for the reagent; "test reaction area" is defined as that part of the test device matrix incorporating a test reagent composition specifically reactable with the analyte being determined; "sheath" is defined as the test fluid impervious, transparent or translucent material which in a SERIM type test device covers or encloses the matrix; and "SERIM" is an acronym for sheath enclosed reagent impregnated matrix.

A first preferred embodiment of the present invention comprises the use of a preformed porous attachment layer to join and retain in intimate or contiguous contact two or more matrices, at least one of which is impregnated or incorporated with a reagent, in a face to face relationship such that when the structure is contacted with the sample, the fluid may enter and flow freely between such matrices.

The attachment layer and the utilization thereof in the fabrication of test devices is the main point of novelty of the present invention. Basically, this attachment layer material comprises an inert fibrous woven or non-woven sheet material of substantial porosity which is amenable to attachment to paper or polymeric materials such that the paper or polymeric materials become intimately bound to each other and yet does not form a barrier to the free flow of fluids or chemical substances. Preferably, the attachment layer is a resilient fusible thermoplastic sheet material having "pores" of about from 0.05 mm to 1.0 mm. A "pore" is defined as the average distance between filaments. Since the attachment layers of the present invention can be and preferably are non-woven fabric-like materials, the pores are usually irregular in appearance and are based on random filament placement. Exemplary of the materials that can be used in the present structure are the VILE- DON nonwoven thermoplastic materials made of nylon or polyester materials. Such products have a thickness of about from 0.2 to 0.6 mm, a filament diameter of about from 0.04 to 0.06 mm, and weight about from 20 to 80 grams per square meter. Obviously, depending on the application, other plastic and adhesive-like materials may be used so long as the porosity and the lamination characteristics are acceptable. Other thermoplastic materials such as polycarbonates, polyethylenes, polyolefins and PVCs can likewise be used.

Usual materials and preparation techniques are employed to prepare the test reagents and the matrices therefor prior to and after lamination of the multilayer test device of the present invention. For example, if paper is used as the matrix, it is common practise to impregnate the paper with an aqueous or solvent solution of the reagent composition, dry the same in a tunnel or batch dryer and slit the product to an appropriate size. The various matrices are then assembled by utilizing any of a variety of lamination techniques. An appropriate method would be to assemble two or more matrices by passing continuous sheets of the matrices and attachment layers over heated platens and while the attachment layer is fusible, passing the combined assembly between rollers to create intimate contact and adhesion between the matrices. The resulting structure consists of multiple layers of matrices, intimately and evenly attached to each other across their entire attachment surface area except for those area defined by the pores of the attachment layer. In other words, the matrix layers, which include the test reaction areas, are attached continuously, evenly and intimately to each other in the areas defined by the fibers or the non-porous portion of the attachment layer or material. This multilayer device may then be slit to an appropriate size and if the ultimate format is a reagent strip, it may be attached to a plastic backing and slit into individual strips.

When a SERIM type device is assembled using the multilayer attachment procedures of the present invention, the multilayer component may consist of a continuous strip of the multilayer matrices in a face to face relationship extending the entire length of the device or may consist of partial overlapping areas of the strip to allow the free flow of fluid from one area to the next. In either case the multilayer component is slit into strips and laminated between the sheath material using common laminating techniques.

Referring now to the drawings, FIG. 1 represents an exploded perspective view of a reagent strip device 10 consisting of an elongated flat plastic handle 11 to which is attached at the end thereof, using a double faced adhesive tape 12, a multilayer dry reagent test system 13 consisting of a first absorbent matrix 14 and a second absorbent matrix 16 attached to each other in a face to face relationship using a nonwoven thermoplastic attachment layer 15. Either or both of the matrices 14 and 16 may be impregnated with the dried residue of a test reagent composition specific for the analyte under consideration. In this embodiment, the matrices 14 and 16 are individually impregnated with the reagent composition and then attached to each other using the attachment layer 15 and then affixed to the handle 11 using the adhesive tape 12.

Figure 2:
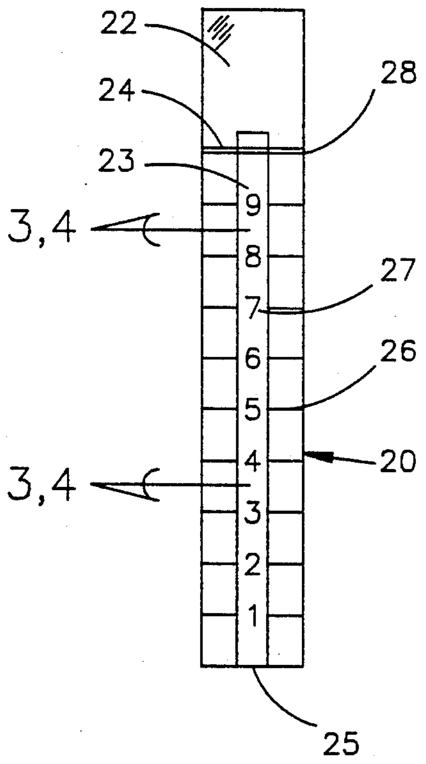
FIG. 2 is a front view of a SERIM type test device.

FIG. 2 shows a front view of a SERIM type test device 20 wherein a multilayer strip of reagent impregnated paper matrix 23 is laminated between two sheets of transparent plastic 22 (the back sheet not shown), the face portion of the front sheet being printed with marking lines 26 and a numerical scale 27 for ease of reading the extent of reaction in the matrix 23. The upper end of the matrix 23 is covered with a signal string 24 which is likewise laminated between the plastic sheets 22 but exposed to the atmosphere at opening 28. The lower end of the matrix 23 is likewise exposed to the atmosphere at opening 25 such that when the device 20 is immersed in the fluid being tested, such fluid enters the opening and wicks up the matrix by capillary action.

Figure 3:
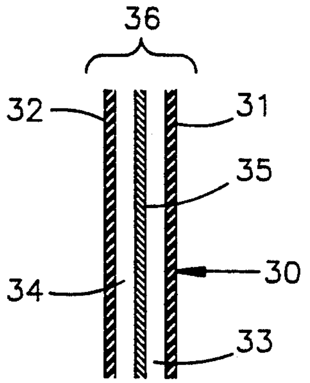
FIG. 3 is an enlarged partial longitudinal sectional view of a SERIM type test device showing a laminated structure running the entire length of the test device matrix.

FIG. 3 is an enlarged partial sectional view of the SERIM type test device 30 wherein the multilayer strip matrix 36 extends the entire length of the device and fluid travelling in the device essentially flows simultaneously through both of the matrices 33 and 34 held between layers of plastic 31 and 32. The multilayer strip is constructed by attaching the preprepared matrices 33 and 34 together by means of attachment layer 35 (interface area) and subsequently laminating the multilayer devices between the sheet of plastic 31 and 32. In such a device the fluid can travel up the multilayer strip 36 and intermingle between the individual matrices 33 and 34.

Figure 4:
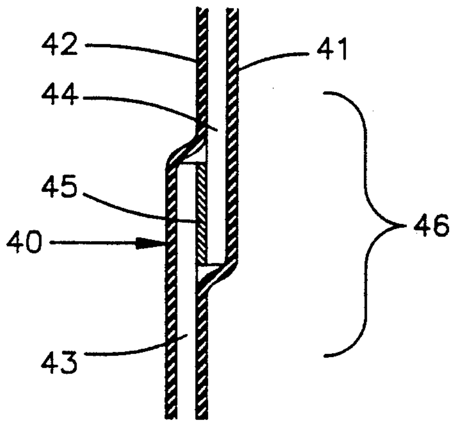
FIG. 4 is an enlarged partial longitudinal sectional view of a SERIM type test device showing a laminated structure involving only a portion of the length of the test device matrix.

FIG. 4 is an enlarged partial longitudinal sectional view of a SERIM type device 40 wherein the multilayer matrix 46 consists of separate preprepared strip matrices 43 and 44 attached end to end by attachment layer 45 (interface area) and subsequently laminated between sheets of transparent plastic 41 and 42 such that fluid must travel by capillary action from one layer to the next through the attachment layer 45.

EXAMPLES

Example 1—Test for Ketones in Urine

Background: In a reagent strip urine ketone test utilizing a nitroprusside compound, the reaction must proceed in an alkaline medium; however, in such an environment, the nitroprusside is very unstable. In the following example, a multilayer test device was prepared to isolate the nitroprusside until the device comes into contact with the fluid being tested, which in this case is urine.

A reagent strip test for ketones in urine was prepared by making up a solution of the following: glycine, 25 grams; $Na_3PO_4.12H_2O$, 28 grams; disodium phosphate-anhydrous, 12 grams; distilled water, q.s. to 100 ml. A sheet of bibulous filter paper was dipped into this solution and dried for 10 minutes at 100° C.

A second solution was prepared as follows: sodium nitroprusside, 1 gram; distilled water, q.s. to 100 ml. A second sheet of filter paper was dipped into this solution and dried at 100° C. for 10 minutes.

The first and second sheets of reagent impregnated paper as prepared above were cut into strips and attached one to the other in a face to face relationship by using an attachment layer consisting of Freudenberg VILEDON fusible web material which is a porous nylon nonwoven filament web material weighing 20 grams per square meter and having a thickness of 0.008 in. The lamination took place at 150° C. and utilized pressure rolls to create intimate contact of the matrices to the attachment layer and to each other. The resultant multilayer matrix structure was cut into 1/5 in. squares and attached to clear plastic handles using double faced adhesive tape.

The resultant reagent strips were stable and reacted to give varying shades of purple depending on the concentration of ketone in urine.

Example 2—Test for Formaldehyde in Water

Background: Formaldehyde is used extensively as a chemical sterilant; however, this compound is considered a carcinogen and must be carefully monitored. The following test can be used to detect low levels of this toxic chemical.

A device similar in structure to the one described above in Example 1 was prepared, except that the top matrix was preprepared by impregnating a piece of filter paper with a 0.1% solution of oxalyldihydrazide and 0.067M sodium phosphate, pH 6.8 and the bottom matrix prepared with 1 mM copper sulfate. When assembled as described above in Example 1 and dipped into a solution of 10 ppm formaldehyde, the test device turned a light blue. A single pad impregnated with all of the above reagents and dried, turned blue prior to being dipped into a formaldehyde solution.

Example 3—Test for Chlorides in Concrete

Background: Chlorides in concrete contribute to corrosion and weakening of steel reinforcing bars and cause the dried concrete to crumble. It is common practise to use a SERIM type test device to measure chlorides in wet concrete before pouring; however, the alkalinity of the wet concrete causes blackening of the reagent and obscures low level readings of chloride concentration in such devices.

A SERIM type device was prepared by first impregnating a strip of filter paper with a solution of 0.5% silver dichromate and dried. A second strip of ion exchange filter paper impregnated with about 45% by weight of $R\text{-}SO_3H^+$ ion exchange resin was attached in an end to end slightly overlapping manner to the first strip as shown in FIG. 4 using a VILEDON IDSP20 nonwoven polyester attachment layer. The attachment was accomplished by heating the VILEDON attachment layer and an end portion of each of the above strips of impregnated paper to a temperature of about 115°-120° C. and inserting the VILEDON material between the strips so that they overlap about an eighth of an inch and pressure rolling the materials together. The end to end multilayer strip is then laminated between thermoplastic sheet material as shown in FIG. 2. When used to test for chloride in concrete, there was no noticeable blackening at the lower end of the device while the silver dichromate paper without the ion-exchange layer exhibited pronounced blackening in the same region.

What is claimed is:

1. A method of fabricating a multilayer test device for the determination of analytes in test fluids, the method comprising:

A. incorporating a reagent composition into at least a portion of one of two or more porous matrix layers to form a test reaction area in the matrix layer incorporating the test reagent composition;

B. placing an attachment layer consisting of a preformed fibrous sheet material of a fusible thermoplastic polymer having sufficient porosity to permit the flow of fluid therethrough between each adjacent matrix layer; and, C. laminating the matrix layers and attachment layers together whereby the attachment layers form a continuous interface area between said matrix layers so that said matrix layers are laminated or fusion bonded evenly and continuously to each other across the entire attachment surface area except in those areas defined by the pores of the attachment layer.

2. A method as in claim 1 wherein the lamination is accomplished by using heat.

3. A method as in claim 2 wherein the thermoplastic polymer is a nonwoven fabric material having a pore size of about from 0.05 to 1.0 mm.

4. A method as in claim 1 wherein the porous matrix layers are paper.

5. A method as in claim 1 wherein the porous matrix layers are a combination of paper and polymeric membrane.

6. A multilayer dry reagent test device for the determination of analytes in test fluids comprising:

A. at least two layers of porous matrix material in contiguous relationship, at least one of which is incorporated with a test reagent composition to form a test reaction area, and B. a preformed fibrous attachment layer of a fusible thermoplastic material located between adjacent matrix layers and having sufficient porosity to permit the free flow of test fluid between adjacent matrix layers, wherein said attachment layer forms a continuous interface area between said matrix layers so that said matrix layers are laminated or fusion bonded evenly and continuously to each other across the entire attachment surface area except in those areas defined by the pores of the attachment layer.

7. A test device as in claim 6 wherein the thermoplastic material of the attachment layer retains its basic porous character upon being laminated by heat between the layers of matrix material.

8. A test device as in claim 6 wherein the matrix layers are laminated together in a face to face relationship.

9. A test device as in claim 8 wherein the laminated layers of matrix material are attached to a plastic backing forming a handle for the multilayer device.

10. A test device as in claim 6 in which the attachment layer is a nonwoven fabric material.

11. A test device as in claim 6 in which the attachment layer has a pore size of from about 0.05 to 1.0 mm.

12. A test device as in claim 6 in which the matrix layers are bibulous paper.

13. A test device as in claim 6 wherein the matrix layers are a polymeric membrane.

14. A test device as in claim 6 wherein the multilayer device is laminated between sheets of transparent plastic material forming a sheathed encased reagent impregnated matrix test device.

15. A test device as in claim 6 wherein the matrix layers are a combination of bibulous paper and polymeric membrane.

* * * * *